UNITED STATES PATENT OFFICE.

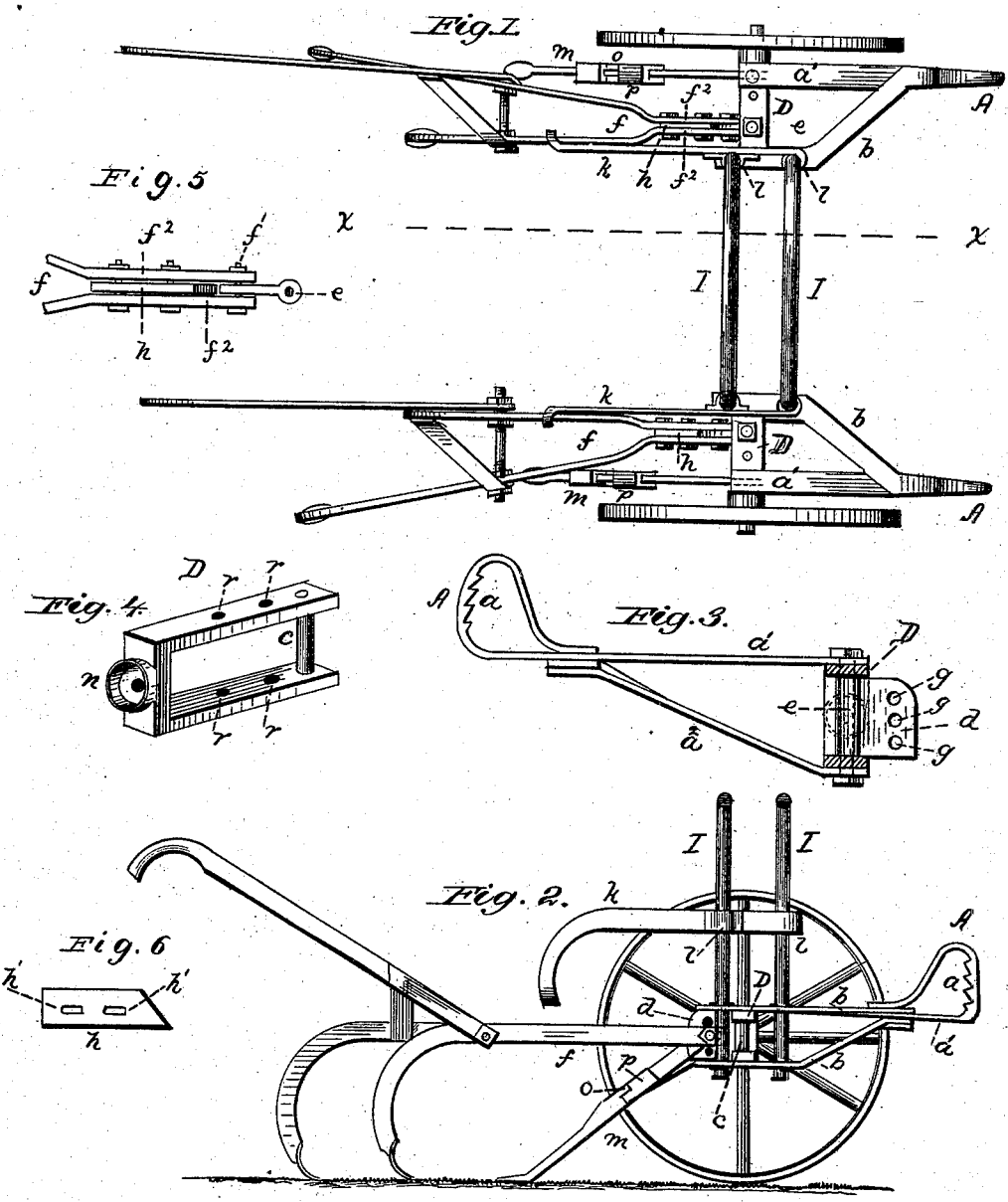

EDWARD A. BAIRD AND ALVIN T. GALE, OF PIQUA, OHIO.

IMPROVEMENT IN CULTIVATORS.

Specification forming part of Letters Patent No. 211,314, dated January 14, 1879; application filed November 23, 1878.

*To all whom it may concern:*

Be it known that we, E. A. BAIRD and A. T. GALE, of Piqua, in the county of Miami and State of Ohio, have invented certain new and useful Improvements in Cultivators; and we do hereby declare that the following is a full, clear, and exact description thereof, which will enable others skilled in the art to which it appertains to make and use the same, reference being had to the accompanying drawings, and to letters of reference marked thereon, which form a part of this specification.

Our invention relates to that class of agricultural implements known as "wheel-cultivators;" and consists in certain improvements in the construction thereof, as will be hereinafter shown and described, and specifically pointed out in the claims.

In the drawing, Figure 1 is a plan view of our improved wheel-cultivator. Fig. 2 is a section taken on the line $x\ x$, Fig. 1, and shows the side of the carriage which is opposite to the wheel. Fig. 3 is an enlarged side elevation of one of the hitch-irons A and hinge-plates $d$ connected with one of the clevises, the latter-named device being represented in section. Fig. 4 is an enlarged perspective view of one of the clevises, and shows the end through which the wheel-axle passes. Fig. 5 is a plan view of one of the hinge-plates $d$ detached from the clevis, and also shows the wedge-plate $h$ secured between the plow-beams. In this view a portion only of the plow-beam is shown. Fig. 6 is a side view of the above-mentioned wedge-plate $h$.

In our construction the carriage-gear is made in two parts, each of said parts being properly braced and provided with a draft or hitch iron.

Connection is formed between the two carriages by arches mounted upon them and pivoted to allow a free backward or forward movement of the carriages relatively to each other.

An adjustable connection is provided between the carriage-gear and each of the plow-beams, and supports extend from the arches, upon which said supports the plow-beams, when not in use, may be suspended in an elevated position, and when the plow-beams are raised from the ground the carriages are sustained in position by drags or shoes provided for such purpose.

Referring to the drawings for the details of construction of the various parts of our improved cultivator, the double hitch-irons A A are formed with ratchet-teeth $a$, whereby the single-trees may be raised or lowered, so as to regulate the depth of the plowing, and each of these said irons has an extension part, $a^1$, riveted upon the clevis D near the wheel. An under brace, $a^2$, extends backward from the iron, and is riveted to the under side of the clevis below the above-named extension $a^1$. Each one of these hitch-irons is additionally strengthened by means of two braces, $b\ b$, which are secured to the other end of the clevis by a bolt, $c$, which passes through the same and between the upper and lower jaws of the clevis. A hinge-plate, $d$, is swiveled to each clevis by means of a vertical bolt, $e$, and is also hinged to the plow-beam $f$ by means of a bolt or pin, $f^1$, so that the plow may be swung either to the right or to the left in a horizontal plane around bolt $e$, or raised up or lowered upon its hinge formed by bolt $f^1$ when it is desired to move the same vertically. The hinge-plates have each three holes, $g$, near their rear edges, so that the plow-beams may be adjusted vertically, in order to the more perfectly regulate the depth of the plowing. Back of the hinge-plates $d$, and between the parts $f^2\ f^2$ of the plow-beam, we secure, by means of bolts, the wedge-plates $h\ h$. Each plate is formed with two slots, $h'$, for the bolt, so that its position with reference to the hinge-plate $d$ may be determined, and each has its front end beveled, with the slope extending upwardly and away from the hinge-plate, whereby, while the plow-beams may be readily raised, yet, after it has been lowered to its proper position, the lower portion of the wedge-plate $h$ will abut against the hinge-plate, and thus forms a joint, which will keep the plow-beams and carriages in horizontal planes, and prevent the clevises, with the arches, presently to be described, from falling forward.

I I represent two arches, which connect the two carriages; but, if desired, more than two arches may be employed. These arches are composed of vertical standards and horizontal cross-bars. The lower ends of these standards pass down through the braces $b\ b$ of the hitch-irons and are swiveled therein, so that the carriages may have, relatively to each other, independent forward and backward movements. Upon these arches we secure arms $k$ $k$ by means of collars $l$ $l$, which fit upon the standards of the arches. The rear end of each arm has a hook, upon which the plow may be suspended in an elevated position when desirable.

Each carriage is provided with a drag or shoe, $m$, secured in position at its upper end within the clevis by the axle-tree of each wheel, which passes through the end $n$ (see Fig. 4) of the clevis, and also through the upper end of the drag. Suitable nuts are fitted upon the ends of the axles in order to maintain the drags in position thereon. The drags are composed of two parts hinged together at $o$, and each has a sliding collar, $p$, whereby the two parts may be kept rigidly in line by slipping the collars over the hinges. By moving the collars away from the hinges the lower portions of the drags or shoes may be turned up out of the way when it is not desirable for the shoe or shoes to drag upon the ground.

It will be noticed that each clevis is provided with two sets of holes, $r$, Fig. 4, whereby the hinge-plates may be adjusted to different widths apart, thereby causing the plows to run closer together or farther apart, as required.

The arches for these cultivators may be made of any desired width, so as to bring the wheels nearer together or wider apart, as may be needed, for the cultivation of corn, cotton, or other crops.

What we claim is—

1. In combination with the hinge-plate $d$, the wedge-plate $h$, adjustably secured between the forward ends of the plow-beam, and having the side adjacent to the hinge-plate beveled, substantially as shown, and for the purpose specified.

2. The shoe $m$, pivoted between the clevis D and provided with a hinge-joint at $o$, and sliding collar $p$, in combination with the hinged plow-beam $f$ and hooked arm $k$, substantially as set forth.

3. The arches I I, pivoted in the braces $b$ $b$, in combination with the clevis D, constituting bearings for the axles of a two-wheel cultivator, as herein shown, and for the purpose described.

4. The swiveled arches I I, adapted to turn in the arms $k$, provided with hooked ends, in combination with the shoes $m$ and clevises D, or equivalent supporting frame-work for the arches of the carriages, substantially as shown and specified.

In testimony that we claim the foregoing as our own we affix our signatures in presence of two witnesses.

EDWARD A. BAIRD.
ALVIN T. GALE.

Witnesses:
WALTER S. THOMAS,
S. E. CARPENTER.